(12) United States Patent
Peterson et al.

(10) Patent No.: US 9,868,380 B2
(45) Date of Patent: Jan. 16, 2018

(54) TRANSPORTABLE DROP TRAILER

(71) Applicant: CGS Premier, New Berlin, WI (US)

(72) Inventors: Greg Peterson, Hartland, WI (US); James Requejo, Shorewood, WI (US); Brad Thomas, Wind Lake, WI (US)

(73) Assignee: CGS Premier, New Berlin, WI (US)

( * ) Notice: Subject to any disclaimer, the term of this patent is extended or adjusted under 35 U.S.C. 154(b) by 0 days.

(21) Appl. No.: 15/046,189

(22) Filed: Feb. 17, 2016

(65) Prior Publication Data

US 2017/0232880 A1 Aug. 17, 2017

(51) Int. Cl.
*B60P 3/025* (2006.01)

(52) U.S. Cl.
CPC .................................. *B60P 3/025* (2013.01)

(58) Field of Classification Search
CPC ....................................................... B60P 3/025
USPC ................................................. 296/26.02, 21
See application file for complete search history.

(56) References Cited

U.S. PATENT DOCUMENTS

| | | | | |
|---|---|---|---|---|
| 3,692,350 A * | 9/1972 | Radtke | .................. | B60P 3/0257 296/21 |
| 4,438,580 A * | 3/1984 | Yamaji | .................. | G09F 21/048 296/21 |
| 5,108,122 A * | 4/1992 | Beagley | .................. | A47F 3/004 280/43.2 |
| 5,310,209 A * | 5/1994 | Holman | ................ | B60P 3/0255 280/43.1 |
| 5,639,139 A * | 6/1997 | Rush | ....................... | B60P 3/025 280/763.1 |
| 6,036,250 A * | 3/2000 | Glatter | ................... | B62D 63/08 296/181.5 |
| 6,416,101 B1 * | 7/2002 | Bartch | ................... | B60P 3/0257 296/168 |

(Continued)

FOREIGN PATENT DOCUMENTS

| | | | | |
|---|---|---|---|---|
| WO | WO 2004058128 A1 * | 7/2004 | ............. | A61G 3/001 |
| WO | WO 2011160167 A1 * | 12/2011 | ............. | B60P 3/025 |

OTHER PUBLICATIONS

Dearborn Concession Trailers, "Dearborn Custom Built Hydraulic Trailer-Interior," <https://www.youtube.com/watch?v=DWECJ9liwig> YouTube video published on Oct. 31, 2011.

(Continued)

*Primary Examiner* — Pinel E Romain
(74) *Attorney, Agent, or Firm* — Michael Best & Friedrich LLP

(57) ABSTRACT

A transportable display is transportable using a tow vehicle and includes a display portion movable between a transport configuration and a display configuration, and a trailer frame attachable to a tow vehicle and arranged to support the display portion. A first wheel assembly is attached to the frame and is operable to at least partially support the trailer during transport and a second wheel assembly is attached to the frame and is operable to at least partially support the trailer during transport, the first wheel assembly and the second wheel assembly movable between a transport position and a display position. A plurality of legs is coupled to the frame. The legs are movable between a stowed position and a support position, wherein the plurality of legs supports the trailer frame when the first wheel assembly and the second wheel assembly are in the display position.

13 Claims, 10 Drawing Sheets

(56) References Cited

U.S. PATENT DOCUMENTS

| | | | | |
|---|---|---|---|---|
| 6,634,668 B2* | 10/2003 | Urffer, III | ............... | A47F 5/108 |
| | | | | 280/47.35 |
| 6,817,653 B2* | 11/2004 | Ropp | ................. | B60P 3/14 |
| | | | | 224/403 |
| 7,052,062 B2* | 5/2006 | Catt | ..................... | A47F 9/00 |
| | | | | 222/610 |
| 7,360,784 B2* | 4/2008 | Stewart | ................ | B60J 7/1614 |
| | | | | 220/4.16 |
| 8,484,908 B2* | 7/2013 | Hache | .................. | B60P 3/14 |
| | | | | 137/234.6 |
| 8,550,528 B2 | 10/2013 | Sidi | | |
| 9,428,027 B2* | 8/2016 | Iliuta | ..................... | B60P 1/027 |
| 2002/0180228 A1* | 12/2002 | Poarch | .................. | B25H 3/02 |
| | | | | 294/143 |
| 2010/0187794 A1* | 7/2010 | MacDougall | ............ | G09F 7/18 |
| | | | | 280/491.3 |
| 2016/0289985 A1* | 10/2016 | Stroud | ..................... | E04H 3/28 |

OTHER PUBLICATIONS

Schantz Mfg. Inc., "Custom Concession Trailers & Mobile Kitchens," <http://www.schantzmfg.com/> webpage available at least as early as Jan. 16, 2011.

Schantz Mfg. Inc., "Custom Concession Trailers & Mobile Kitchens: Full Retractable 15," <http://www.schantzmfg.com/retractable.html> webpage available at least as early as Aug. 31, 2012.

\* cited by examiner

TRANSPORTABLE DROP TRAILER

BACKGROUND

The invention relates to transportable displays, and more particularly to trailer transportable delays.

Displays are built and used for sales conferences or other temporary uses. Often the displays are transported using trailers that can be towed on the roadway. Once the display arrives, it is removed from the truck and moved to its final location for use. After it is used, it is moved back to the trailer and transported to the next location.

SUMMARY

In one construction, a transportable display is transportable using a tow vehicle and includes a display portion movable between a transport configuration and a display configuration, and a trailer frame attachable to a tow vehicle and arranged to support the display portion. A first wheel assembly is attached to the frame and is operable to at least partially support the trailer during transport and a second wheel assembly is attached to the frame and is operable to at least partially support the trailer during transport, the first wheel assembly and the second wheel assembly movable between a transport position and a display position. A plurality of legs are coupled to the frame. The legs are movable between a stowed position and a support position, wherein the plurality of legs supports the trailer frame when the first wheel assembly and the second wheel assembly are in the display position.

In another construction, a transportable display is transportable using a tow vehicle and includes a display portion movable between a transport configuration and a display configuration, a trailer frame attachable to a tow vehicle and arranged to support the display portion, and a first wheel assembly and a second wheel assembly attached to a first side of the frame and operable to at least partially support the trailer during transport. A third wheel assembly and a fourth wheel assembly attached to a second side the frame opposite the first side and are operable to at least partially support the trailer during transport, the first wheel assembly, the second wheel assembly, the third wheel assembly, and the fourth wheel assembly are movable between a transport position and a display position. Four legs are coupled to the frame, the four legs are movable between a stowed position and a support position, wherein the four legs cooperate to support the trailer frame when the first wheel assembly, the second wheel assembly, the third wheel assembly, and the fourth wheel assembly are in the display position.

In yet another construction, a method of transporting a display includes mounting the display on a movable trailer that includes a first wheel assembly and a second wheel assembly, transporting the movable trailer using the first wheel assembly and the second wheel assembly to support the movable trailer and the display, and extending a plurality of legs to lift the movable trailer and the display. The method also includes decoupling a portion of the first wheel assembly and the second wheel assembly from the movable trailer and retracting the plurality of legs to lower the movable trailer while raising the first wheel assembly and the second wheel assembly.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
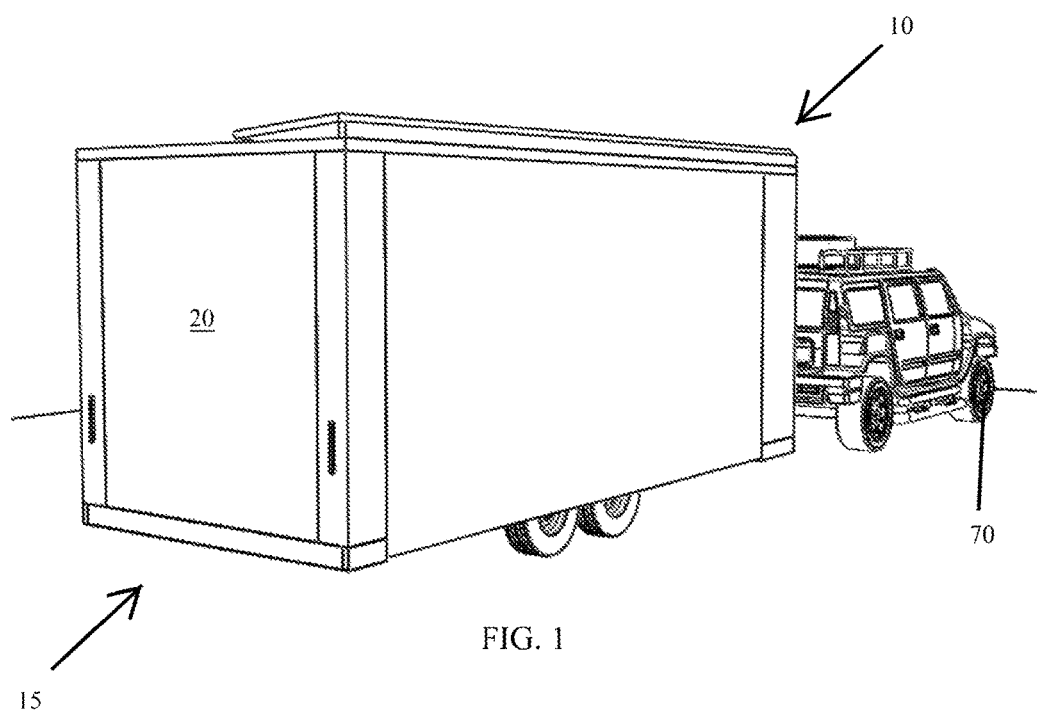
FIG. 1 is a perspective view of a display unit on a trailer for towing.

FIGS. 1-4 illustrate a transportable display 10 including a drop trailer 15 supporting a display portion 20 in various operating positions. The display 20 includes a floor 25, a plurality of walls 30, and a ceiling 35 that are connected to the drop trailer 15. The display 20 defines an interior space with some or all of the walls 30 being movable between a closed arrangement as illustrated in FIG. 1 and an open position illustrated in FIG. 2. The display 20 also defines a pair of wheel pockets 40 that will be discussed in greater detail.

The drop trailer 15 includes a first wheel assembly 45 and a second wheel assembly 50 on a first side of the trailer 15 and a third wheel assembly 55 and a fourth wheel assembly 60 on a second side of the trailer 15 opposite the first side of the trailer 15. A hitch member 65 at the front of the trailer 15 facilitates attachment of the trailer 15 to a tow vehicle 70 for transport. When connected to the vehicle 70 and positioned in the transport position as illustrated in FIG. 1, the drop trailer 15 and the display 20 can be transported on roads and highways.

Figure 2:
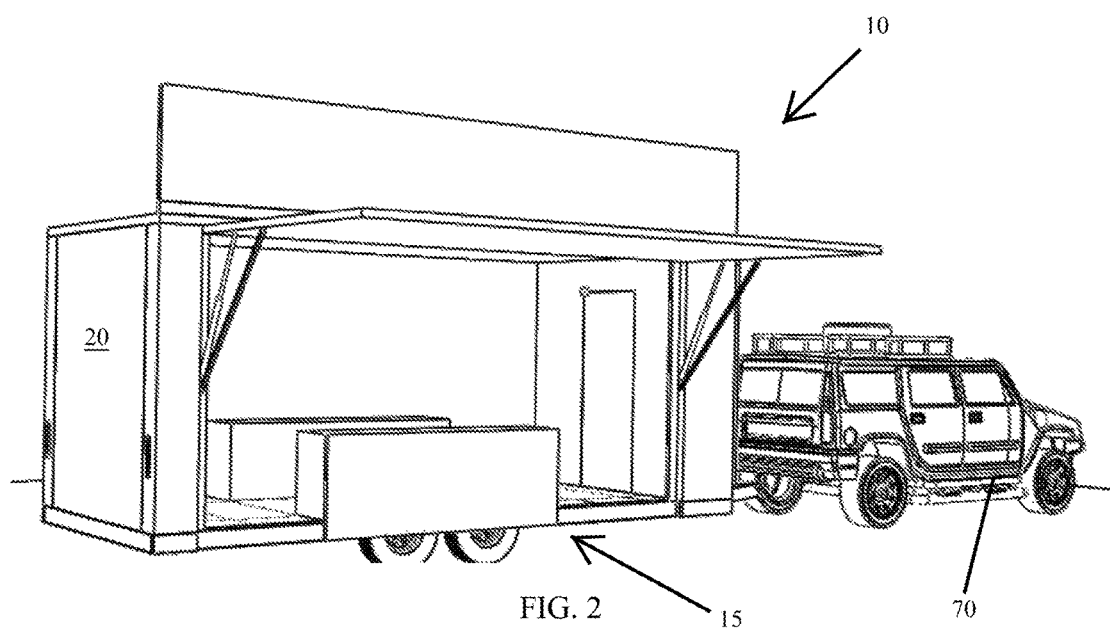
FIG. 2 is a perspective view of the trailer of FIG. 1 in a partially opened configuration.

FIG. 2 illustrates the display 20 in a deployed or display arrangement. As can be seen, one of the walls 30 has been moved to an open position to expose the interior of the display 20 and further acts as a roof for an exterior space. Displays 20 of this type are often used at trade shows or sales meetings to display a company's products in a favorable light. The interior space can be used to show product or for private or semi-private meetings. The arrangement of the display 20 is virtually unlimited so long as it can be moved to a closed position and sized to fit on a trailer that can be towed by the vehicle 70.

Figure 3:
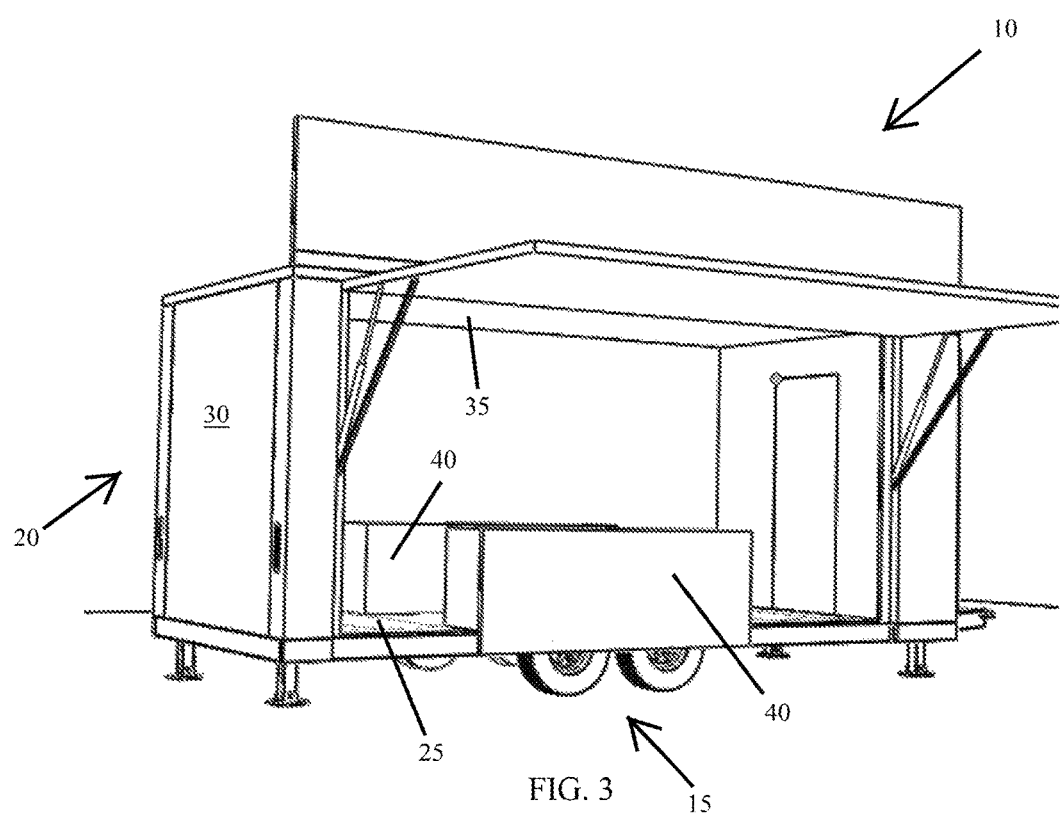
FIG. 3 is a perspective view of the trailer of FIG. 1 in a partially opened configuration and disconnected from the tow vehicle.
Figure 4:
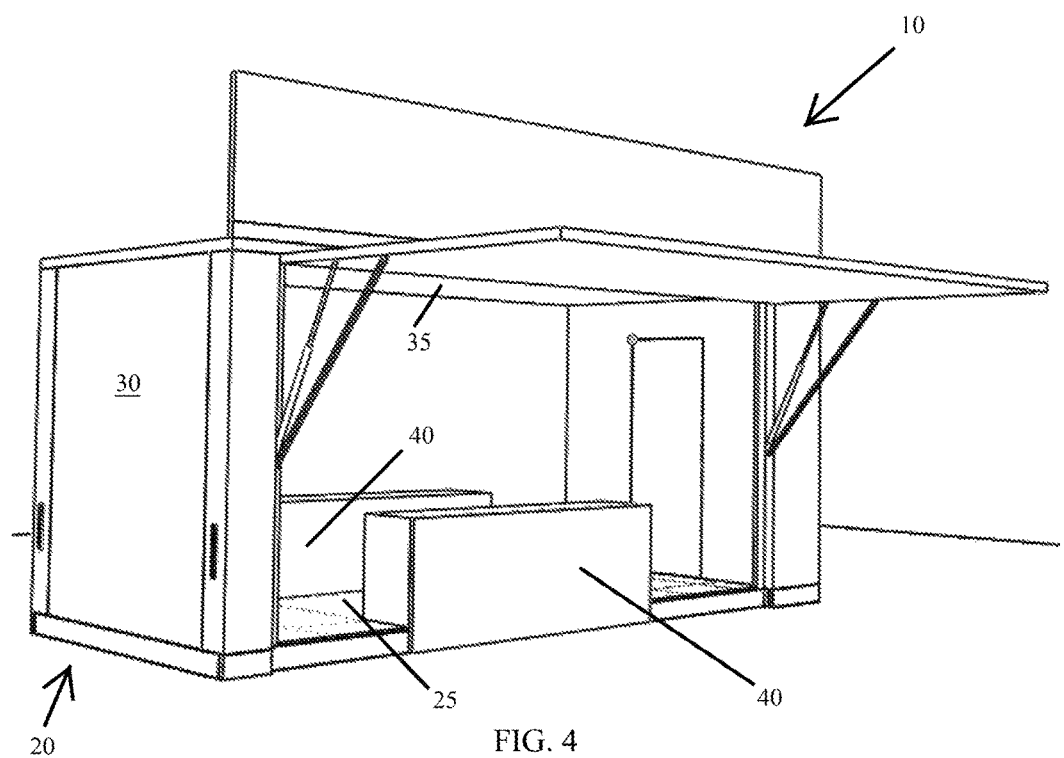
FIG. 4 is a perspective view of the trailer of FIG. 3 in a lowered position.

FIG. 3 illustrates the trailer 15 and display 20 disconnected from the tow vehicle 70 and supported by a plurality of legs 75 that deploy from the trailer 15. As can be seen, the entrance to the display 20 is still quite high above the ground and would require stairs or a ramp to allow convenient entry. As illustrated, the legs 75 and the wheels 45, 50, 55, 60 can be retracted to lower the display 20 to ground level as illustrated in FIG. 4.

Figure 5:
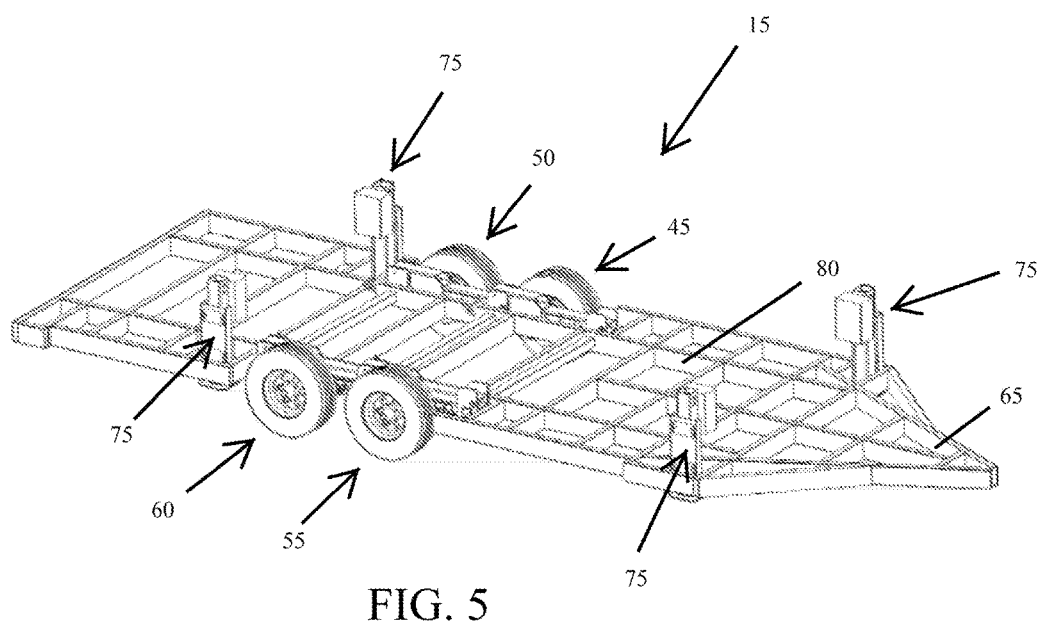
FIG. 5 is a perspective view of the trailer of FIG. 4 with the display portion removed.

The trailer 15, best illustrated in FIG. 5 includes a front portion that supports the hitch mechanism 65, four leg assemblies 75, and the four wheel assemblies 45, 50, 55, 60. A structural frame 80 interconnects the hitch mechanism 65, the leg assemblies 75, and the wheel assemblies 45, 50, 55, 60, and provides the needed structural support for the display 20 during transport. In preferred constructions, structural steel elements are welded together in a desired shape or pattern to match the actual display 20 being transported.

Figure 6:
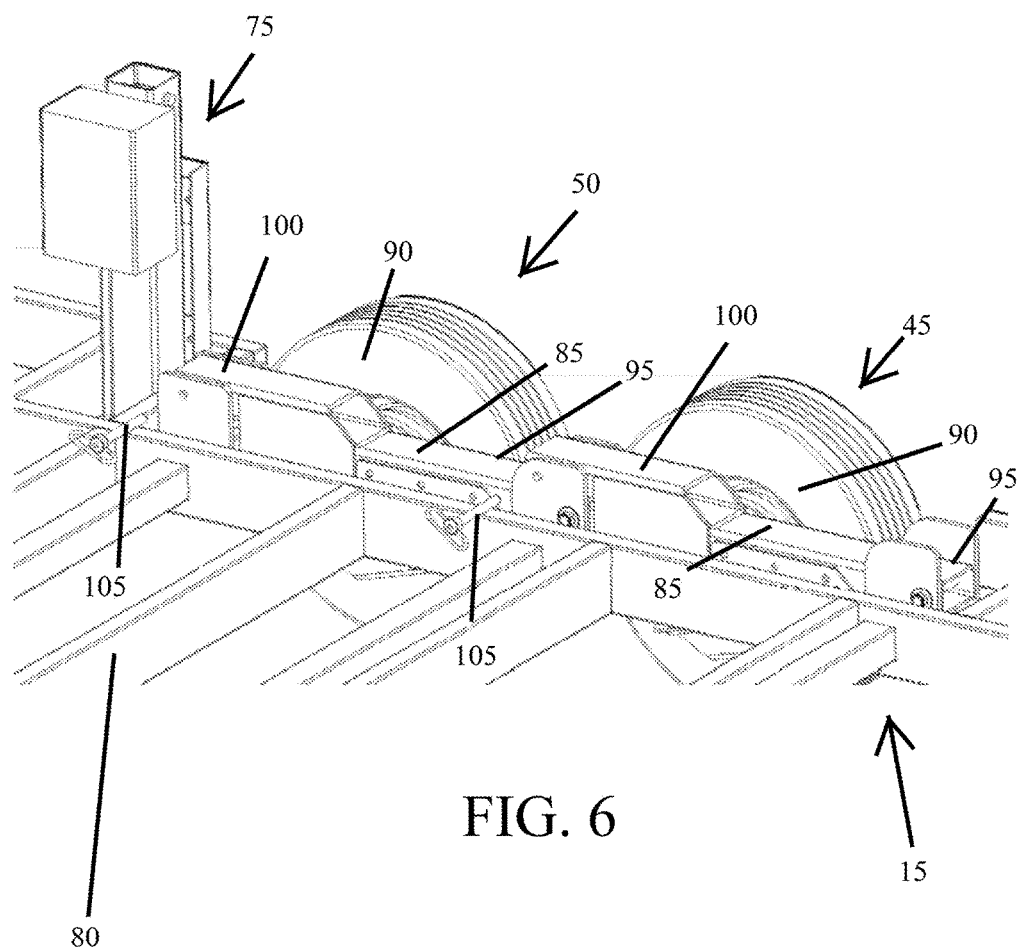
FIG. 6 is a perspective view of a portion of the trailer of FIG. 5.
Figure 7:
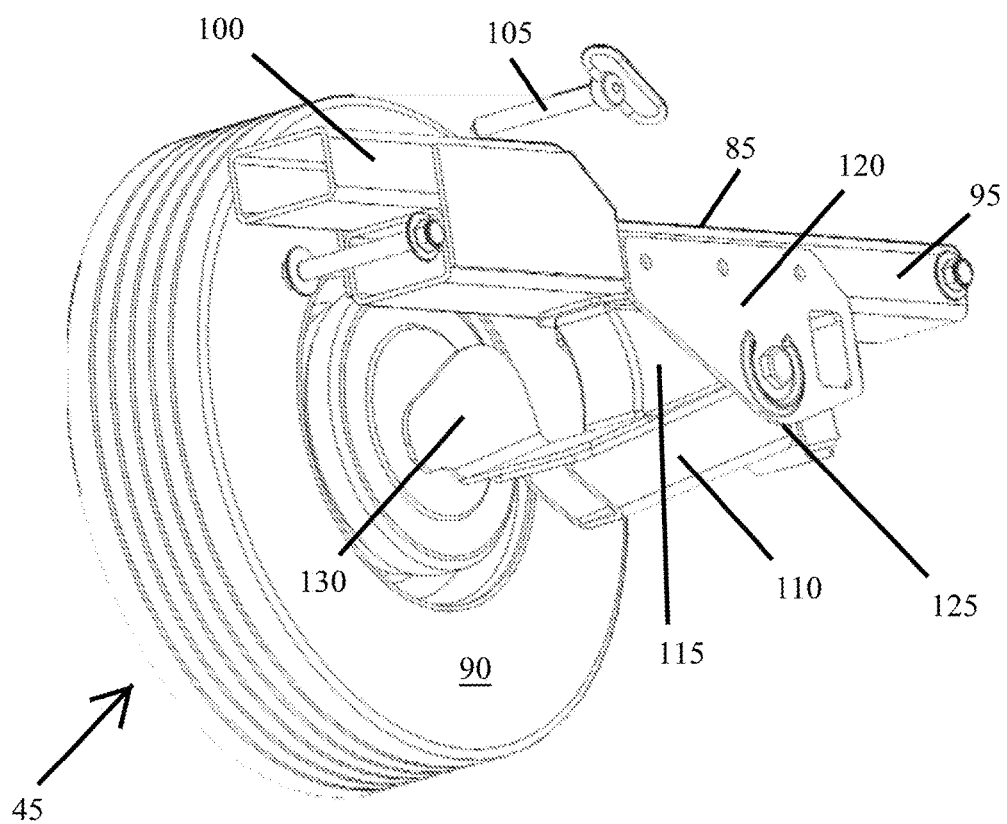
FIG. 7 is an enlarged perspective view of one of the wheels and suspension of the trailer of FIG. 6.
Figure 8:
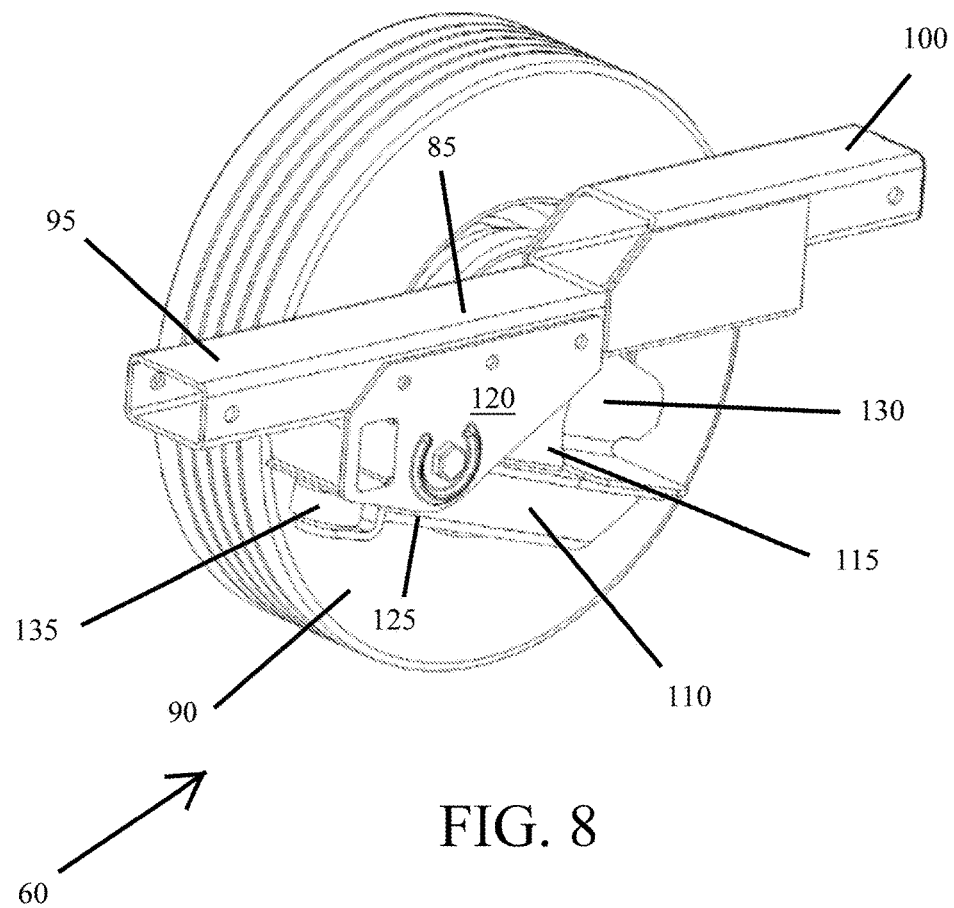
FIG. 8 is an enlarged perspective view of one of the wheels and suspension of the trailer of FIG. 6.
Figure 9:
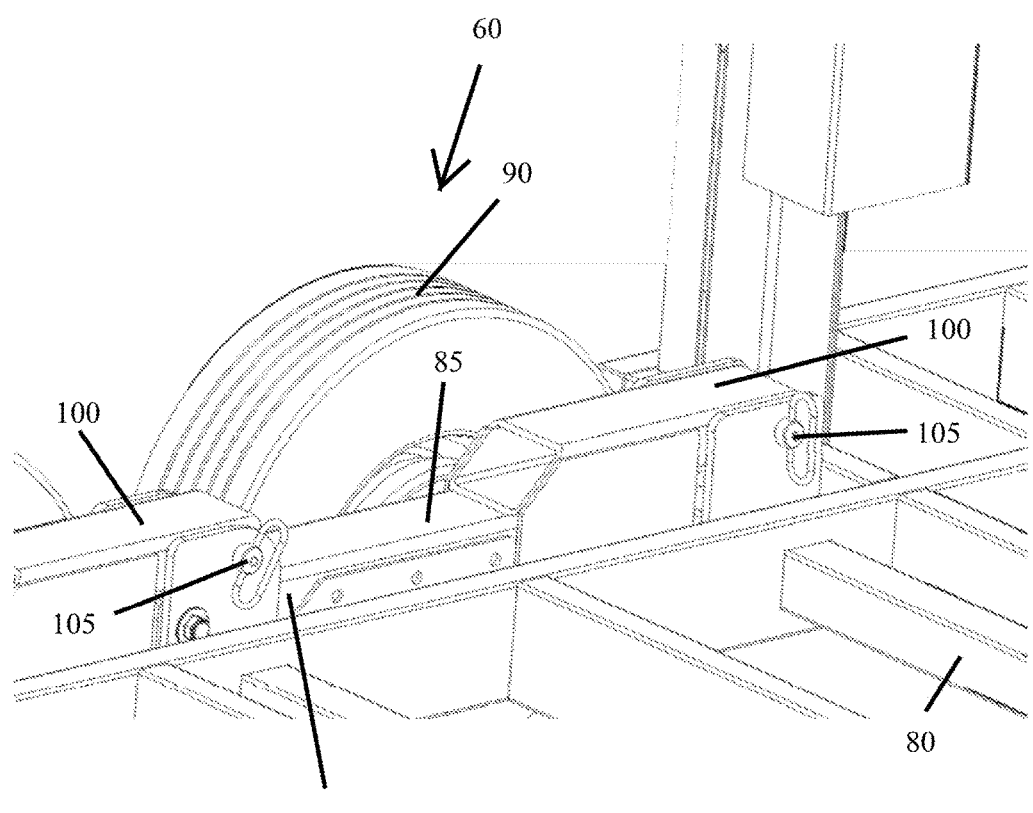
FIG. 9 is a perspective view of one of the wheels of the trailer in a display position.

FIGS. 6-9 better illustrate the wheel assemblies 45, 50, 55, 60 that support the trailer 15 for transportation. As illustrated in FIG. 6, the first wheel assembly 45 and the second wheel assembly 50 are positioned in line with one another on the first side of the trailer 15. Each wheel assembly 45, 50, 55, 60 includes a pivot arm 85 and a wheel 90. The pivot arm 85 includes a first end 95 that pivotably attaches to the structural frame 80 and a second end 100 that is selectively attachable to the structural frame 80. A pin 105 is used to interconnect the structural frame 80 and the pivot arm 85 to fix the position of the pivot arm 85. A user can remove the pin 105 to allow the pivot arm 85 to pivot or rotate about the first end 95 of the pivot arm 85. FIG. 6 illustrates the pins 105 in a removed position, while FIG. 9 illustrates the pins 105 in the engaged position.

FIGS. 7 and 8 better illustrate the wheel assemblies 45, 50, 55, 60 which each include the pivot arm 85, the wheel 90, a suspension arm 110, a wedge block 115, and a channel member 120 arranged to interconnect the pivot arm 85 and the suspension arm 110. The channel member 120 is fixedly attached to the pivot arm 85 and includes a channel space sized to receive a portion of the suspension arm 110 and the wedge block 115.

The suspension arm 110 includes a first end 125 that is pivotably connected to the channel member 120 to allow the suspension arm 110 to pivot with respect to the pivot arm 85. A second end 130 of the suspension arm 110 connects to the wheel 90 at a rotational axis to allow the wheel 90 to freely rotate about the axis while being supported by the suspension arm 110.

The wedge block 115 is a resilient component (e.g., rubber) that is positioned between the pivot arm 85 and the suspension arm 110. In the illustrated construction, the wedge block 115 is wedge shaped to match the angle between the suspension arm 110 and the pivot arm 85. However, other arrangements may utilize different shapes for the wedge block 115. The wedge block 115 operates as a shock absorber or spring to absorb road bumps during transport. In some constructions, the wedge block 115 attaches to one of the suspension arm 110 or the pivot arm 85, or attaches to both. As is better illustrated in FIG. 8, the wheel assembly 45, 50, 55, 60 also includes a damper 135, or shock absorber that cooperates with the wedge block 115 to provide a smooth ride for the trailer 15 and the display 20.

Figure 10:
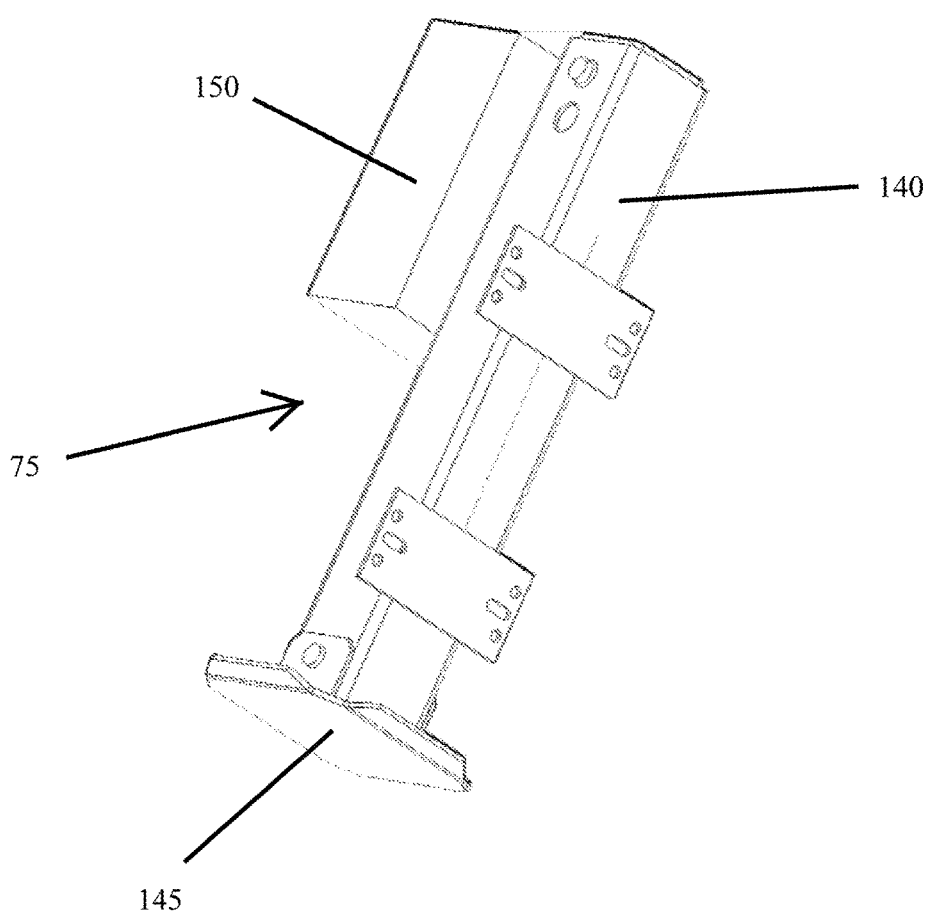
FIG. 10 is a perspective view of a leg of the trailer of FIG. 5.

With reference to FIGS. 6 and 10, the leg assemblies 75 include a fixed tube 140, a movable leg 145, and an actuator 150 that operates to move the leg 145 between an extended and a retracted position. The fixed tube 140 is fixedly attached to the structural frame 80 and supports the movable leg 145. The actuator 150 is preferably a hydraulic actuator that is operable to move the leg 145 along the fixed tube 140 between the retracted position and the extended position. In other constructions, other actuators such as electrical, mechanical, or pneumatic actuators are used in place of the hydraulic actuator 150.

In the construction illustrated in FIG. 5, there are four separate leg assemblies 75 with fewer or more leg assemblies 75 being possible. The leg assemblies 75 operate independently and are preferably powered by a hydraulic pressure unit that is positioned on the trailer 15. Of course other arrangements and other power sources are possible.

It should also be noted that the construction of FIG. 5 includes four wheel assemblies 45, 50, 55, 60. However, any number of wheel assemblies 45, 50, 55, 60 in excess of two could be employed as may be required by the weight and size of the display 20 and trailer 15.

In operation, the drop trailer 15 and display 20 are configured in the transport position with the pivot arms 85 locked in place as illustrated in FIG. 9. The trailer 15 is transported to a desired location and disconnected from the tow vehicle 70. Each of the leg assemblies 75 is moved from the retracted position to the extended position to lift the weight of the trailer 15 and the display 20 off of the wheel assemblies 45, 50, 55, 60. The user then enters the display 20 and removes the pins 105 from each of the wheel assemblies 45, 50, 55, 60. With the pins 105 removed, the wheel assemblies 45, 50, 55, 60 are free to move upward into the display 20 via pivoting motion of the pivot arms 85. The user then lowers the display 20 and the trailer 15 by retracting the legs 75. As the trailer 15 moves downward, the wheels 90 engage the ground which forces them to pivot upward and into a retracted or stowed position within the wheel pockets 40. This arrangement allows the display 20 to move to ground level without any disassembly and without the need for any special equipment. The walls 30 of the display 20 are then moved into the display arrangement.

To remove the display 20, the user reverses the process. First, the legs 75 are extended to lift the trailer 15 and the display 20 until the wheel assemblies 45, 50, 55, 60 drop to a position where the pins 105 can be reinserted to connect the second ends 100 of the pivot arms 85 to the structural frame 80. The pins 105 are then reinserted to lock the wheel assemblies 45, 50, 55, 60 in the transport position. The legs 75 are then moved to the retracted position to lower the trailer 15 onto the wheel assemblies 45, 50, 55, 60 to allow transport. The display 20 is returned to its closed or travel arrangement and the trailer 15 is connected to the tow vehicle 70 for transport.

Various features and advantages of the invention are set forth in the following claims.

What is claimed is:

1. A transportable display transportable using a tow vehicle, the transportable display comprising:
   a display portion movable between a transport configuration and a display configuration;
   a trailer frame attachable to a tow vehicle and arranged to support the display portion;
   a first wheel assembly attached to the frame and operable to at least partially support the trailer during transport;
   a second wheel assembly attached to the frame and operable to at least partially support the trailer during transport, the first wheel assembly and the second wheel assembly movable with respect to the trailer frame between a transport position and a display position; and a plurality of legs coupled to the frame, the legs movable with respect to the trailer frame between a stowed position and a support position, wherein the plurality of legs support the trailer frame to transition the first wheel assembly and the second wheel assembly between the transport position and the display position;

wherein the display portion includes a first pocket sized to receive the first wheel assembly when in the display position and a second pocket sized to receive the second wheel assembly when in the display position; and wherein the first wheel assembly includes a first pivot arm and a first suspension arm pivotably coupled to the first pivot arm, the pivot arm having a first end pivotably coupled to the trailer frame and a second end selectively attached to the trailer frame.

2. The transportable display of claim 1, wherein the display portion includes a plurality of walls and wherein at least one of the walls is movable between a closed position and an open position.

3. The transportable display of claim 1, further comprising a locking pin selectively engageable with the first pivot arm and the trailer frame to lock the first wheel assembly in the transport position and removable to allow movement of the first wheel to the display position.

4. The transportable display of claim 1, further comprising a resilient wedge block positioned between the first pivot arm and the first suspension arm.

5. The transportable display of claim 1, wherein the plurality of legs includes a first hydraulically-actuated leg.

6. A transportable display transportable using a tow vehicle, the transportable display comprising:

a display portion movable between a transport configuration and a display configuration;

a trailer frame attachable to a tow vehicle and arranged to support the display portion;

a first wheel assembly and a second wheel assembly attached to a first side of the frame and operable to at least partially support the trailer during transport;

a third wheel assembly and a fourth wheel assembly attached to a second side of the frame opposite the first side and operable to at least partially support the trailer during transport, the first wheel assembly, the second wheel assembly, the third wheel assembly, and the fourth wheel assembly movable between a transport position and a display position; and a plurality of legs coupled to the frame, each of the plurality of legs movable between a stowed position and a support position, wherein the plurality of legs cooperate to support the trailer frame during the transition of the first wheel assembly, the second wheel assembly, the third wheel assembly, and the fourth wheel assembly between the transport position and the display position, and wherein each of the plurality of legs is retractable to the stowed position to lower the display to ground level and displace the first wheel, the second wheel, the third wheel, and the fourth wheel into the display position;

wherein the display portion includes a first pocket sized to receive the first wheel assembly and the second wheel assembly when in the display position and a second pocket sized to receive the third wheel assembly and the fourth wheel assembly when in the display position; and wherein the first wheel assembly includes a first pivot arm and a first suspension arm pivotably coupled to the first pivot arm, the pivot arm having a first end pivotably coupled to the trailer frame and a second end selectively attached to the trailer frame.

7. The transportable display of claim 6, wherein the display portion includes a plurality of walls and wherein at least one of the walls is movable between a closed position and an open position.

8. The transportable display of claim 6, further comprising a locking pin selectively engageable with the first pivot arm and the trailer frame to lock the first wheel assembly in the transport position and removable to allow movement of the first wheel to the display position.

9. The transportable display of claim 6, further comprising a resilient wedge block positioned between the first pivot arm and the first suspension arm.

10. The transportable display of claim 6, wherein each of the four legs includes a hydraulic actuator operable to move the leg between an extended and a retracted position.

11. The transportable display of claim 6, wherein each of the four legs is independently actuatable.

12. A method of transporting a display comprising:

mounting the display on a movable trailer that includes a first wheel assembly and a second wheel assembly;

transporting the movable trailer using the first wheel assembly and the second wheel assembly to support the movable trailer and the display;

extending a plurality of legs to lift the movable trailer and the display;

decoupling a portion of the first wheel assembly and the second wheel assembly from the movable trailer by removing a locking pin from each of the first and second wheel assemblies; and retracting the plurality of legs to lower the movable trailer while raising the first wheel assembly and the second wheel assembly with respect to the trailer and into respective first and second wheel pockets in the display.

13. The method of claim 12, further comprising pivoting the first wheel assembly and the second wheel assembly into a raised position.

* * * * *